United States Patent [19]
Ohm

[11] 3,914,764
[45] Oct. 21, 1975

[54] APPARATUS FOR REDUCING CROSS COUPLING BETWEEN ORTHOGONAL POLARIZATIONS IN SATELLITE COMMUNICATION SYSTEMS

[75] Inventor: Edward Allen Ohm, Holmdel, N.J.

[73] Assignee: Bell Telephone Laboratories, Murray Hill, N.J.

[22] Filed: Mar. 4, 1974

[21] Appl. No.: 447,588

[52] U.S. Cl...... 343/100 PE; 333/21 A; 343/100 ST
[51] Int. Cl.......................... H04b 7/10; H04b 15/00
[58] Field of Search..... 333/21 R, 21 A, 24.1, 81 R, 333/81 A, 81 B; 343/100 PE, 100 ST

[56] References Cited

UNITED STATES PATENTS 3,728,643 4/1973 Chu .................................. 333/21 A

*Primary Examiner*—Paul L. Gensler
*Attorney, Agent, or Firm*—John J. Torrente

[57] ABSTRACT

In satellite communications systems, linearly polarized orthogonal waves are used for simultaneously transmitting different signal information. In transmission, however, the linearly polarized transmitted waves experience adverse changes in their polarizations due to the polarization rotation and polarization conversion effects of the transmission channel. In particular, as a result of the rotational effect, the linearly polarized waves are rotated by the same variable amount so that the waves retain their linearly polarized states and orthogonality but take on new polarization directions which are inclined at the same angle relative to their original polarization directions. The polarization conversion effect of the channel, in turn, acts upon the rotated linearly polarized transmitted waves and converts these waves into a pair of elliptically polarized waves having arbitrary characteristics which change with changes in the angle of rotation of the rotated waves. The present apparatus involves an arrangement of microwave components having fixed characteristics which can be used to transform the two varying elliptically polarized waves exiting from the transmission channel into replicas of the rotated transmitted waves. In particular, a combination of 3 microwave components, namely a first differential phase-shifter, a differential attenuator comprising two differential attenuator sections, and a second differential phase-shifter having fixed magnitudes and orientations are employed to provide such transformation.

10 Claims, 4 Drawing Figures

APPARATUS FOR REDUCING CROSS COUPLING BETWEEN ORTHOGONAL POLARIZATIONS IN SATELLITE COMMUNICATION SYSTEMS

BACKGROUND OF THE INVENTION

This invention relates to satellite communications systems and, in particular, to apparatus in such systems for reducing cross-polarization interference.

In satellite communications systems, it is well known that the system capacity can be doubled by employing two linearly polarized waves polarized along a first set of orthogonal polarization directions for simultaneously transmitting different signals. In using such waves, however, certain problems arise which must be overcome if satisfactory system operation is to be achieved. These problems center around the transmission channel and its effect on the two transmitted linearly polarized waves.

In particular, the transmission channel is found to exhibit polarization rotation and polarization conversion effects both of which produce adverse changes in the polarizations of the transmitted waves. More particularly, the polarization rotation effect, which is due primarily to Faraday rotation in the ionosphere and which is assumed to act separately from the polarization conversion effect, causes the polarization directions of the linearly polarized waves to be rotated in the same direction through the same rotation angle. The linearly polarized waves thus become polarized along another set of orthogonal polarization directions which are inclined, respectively, at the aforesaid rotation angle to the first set of polarization directions. When so rotated the two transmitted waves will be referred to hereinafter as rotated transmitted waves.

It is important to note that the above-mentioned rotation angle of the rotated transmitted waves is not constant but varies with time. This result stems from the fact that the Faraday rotation mechanism, which, as above-indicated, is the major contributor to the rotational effect of the channel, is a time dependent mechanism.

It can be appreciated that if the transmission channel exhibited only the rotational effect then the waves exiting from the channel would be the above-indicated rotated transmitted waves. In such a case, a receiver designed to receive the waves as originally transmitted and thus aligned to receive waves polarized along the first set of orthogonal polarization directions would not detect each rotated transmitted wave exclusive of the other, since each such wave would have a component along both of the first set of polarization directions. It is apparent, however, that independent detection of each wave could be realized by rotating each of the rotated transmitted waves so that their polarization directions again become aligned respectively with the aforesaid first set of directions. Such a procedure would, in effect, counteract the rotational effect of the channel. Moreover, it could be readily implemented by means of a conventional polarization rotator, such as, for example, a conventional 180° differential phase-shifter, having its orientation controlled by a single servomechanism so as to produce the desired rotation.

Unfortunately, however, as above indicated, the transmission channel exhibits another effect, a polarization conversion effect, in addition to the above-discussed rotational effect, which necessitates the use of other apparatus in conjunction with the abovementioned conventional polarization rotator to fully counteract the adverse effects of the channel. More specifically, the polarization conversion effect can be visualized as acting upon the transmitted waves after they have been rotated, i.e., as acting upon the rotated transmitted waves. In particular, such effect causes each rotated transmitted wave to be converted into an elliptically polarized wave having characteristics which are completely arbitrary and which change with changes in the angle of rotation of the rotated waves.

It can thus be appreciated that in order to totally counteract the adverse effects of the transmission channel, the aforesaid polarization conversion effect must also be counteracted by transforming the elliptically polarized waves exiting the channel into two rotated received waves which are replicas of the two rotated transmitted waves. Once this is accomplished, the rotated received waves can then be passed through a conventional polarization rotator, as above-described, to rerotate the polarizations of the waves so they become aligned with the first set of polarization directions and, hence, with polarization directions of the receiver.

If the characteristics of the elliptically polarized waves exiting the channel were constant with time, the aforesaid simultaneous transformation of the two elliptically polarized waves into the aforesaid rotated received waves could be readily and simply accomplished by means of the polarization conversion device disclosed in U.S. Pat. No. 3,728,643, issued to T. S. Chu on Apr. 17, 1973, since under such circumstances the differential elements (i.e., phase-shifter and attenuator) of such device would both have constant magnitudes and orientations. However, as above-indicated, the characteristics of the elliptically polarized waves exiting the channel are not constant but vary with time. Employment of the aforesaid Chu type device would thus require the use of additional apparatus (at least four additional servosystems) for continuously varying the magnitude and orientation of the differential elements comprising the device. The increased cost and complexity of adding such apparatus to the Chu device has thus prompted a search for a simpler alternative conversion technique.

SUMMARY OF THE INVENTION

In accordance with the principles of the present invention, conversion of the two elliptically polarized waves exiting from a satellite transmission channel into first and second rotated received waves which are replicas, respectively, of the first and second rotated transmitted waves of the channel, for all angles of rotation of such rotated transmitted waves, is accomplished by means of apparatus comprising components having fixed characteristics. Such apparatus is found to comprise a cascase of three differential elements including a first differential phase-shifter, a differential attenuator comprising first and second differential attenuator sections and a second differential phase-shifter.

More particularly, the first differential phase-shifter and first differential attenuator section are initially adjusted in their magnitudes and orientations so that for a preselected set of characteristics of the exiting elliptically polarized waves and, thus, a preselected angle of rotation of the rotated transmitted waves, the elliptically polarized waves are directly transformed by the two differential elements into the aforementioned first and second rotated received waves. With the first differential phase-shifter and attenuator section fixed in such a manner, it has been found that for all other characteristics of the exiting elliptically polarized waves and, hence, for all other angles of rotation of their associated rotated transmitted waves, the two differential elements transform the exiting elliptically polarized waves into first and second pairs of linearly polarized received wave components. The wave components of each of these pairs of received wave components lie along respective first and second orthogonal polarization directions, where the first and second directions are those along which lie the first and second rotated received waves produced when the rotation angle of the rotated transmitted waves is at its preselected value.

More importantly, however, it is found that the phase difference between the first pair of received wave components is equal to the phase difference between the second pair of received wave components. Likewise it is further found that the amplitude ratio of the first pair of received wave components relative to the amplitude ratio of the components of the first rotated transmitted wave along the first and second polarization directions is a constant and is equal to the amplitude ratio of the second pair of received wave components relative to the amplitude ratio of the components of the second rotated transmitted wave along the first and second polarization directions.

It thus can be appreciated that the first and second pairs of linearly polarized received wave components produced by the first phase-shifter and first attenuator section can be simultaneously made to have amplitude ratios equal to those of the component waves which combine to form the first and second rotated transmitted waves, respectively, by fixing the orientation and magnitude of the second differential attenuator section so that the above-indicated constant is made equal to 1. Similarly, such pairs of linearly polarized received wave components can be simultaneously made to have zero phase difference by fixing the orientation and magnitude of the second differential phase-shift section so the above-indicated phase difference is made equal to 0.

With the second attenuator section and second differential phase-shifter adjusted in such a manner, the first pair of received wave components, upon passage therethrough, will sum to a replica of the first rotated transmitted wave (i.e., will sum to the first rotated received wave) and similarly the second pair of received wave components will sum to a replica of the second rotated transmitted wave (i.e., will sum to the second rotated received wave). Since such a result will occur for all characteristics of the exiting elliptically polarized waves, total compensation for the adverse polarization conversion effects of the satellite channel is thereby realized.

DESCRIPTION OF THE DRAWINGS

A clearer understanding of the above-mentioned features of the present invention can be obtained by reference to the following detailed description taken in conjunction with the following drawings in which.

DETAILED DESCRIPTION

Figure 1:
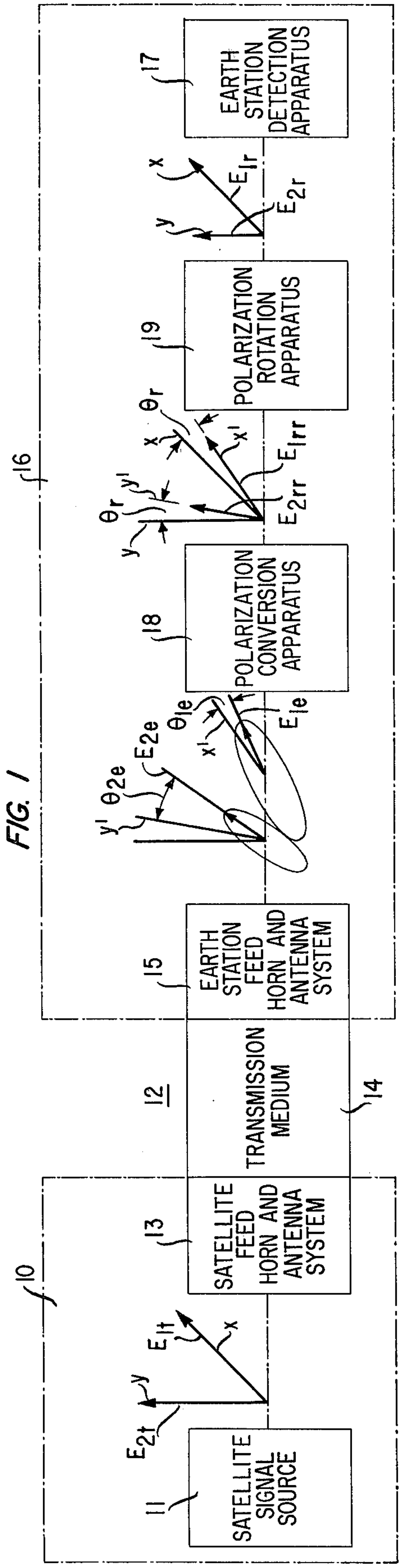
FIG. 1 shows, in block diagram form, a satellite communications system employing a polarization conversion apparatus.

In FIG. 1 a block diagram of a satellite communication system is illustrated. As shown, the satellite system comprises a satellite station 10 which includes a satellite signal source 11. The latter source generates two linearly polarized transmitted waves $E_{1t}$ and $E_{2t}$ which are polarized, respectively, along the orthogonal polarization directions $x$ and $y$. The transmitted waves $E_{1t}$ and $E_{2t}$ are applied to a satellite transmission channel 12 which is illustrated as including a satellite feed horn and antenna system 13, a transmission medium 14 and an earth station feed horn and antenna system 15. The satellite transmission channel 12, in turn, couples the transmitted waves $E_{1t}$ and $E_{2t}$ from the satellite station 10 to an earth station 16. Due to the polarization rotation and polarization conversion effects of the channel, however, such coupling by the channel causes adverse changes in the polarization of the waves $E_{1t}$ and $E_{2t}$.

Figure 2:
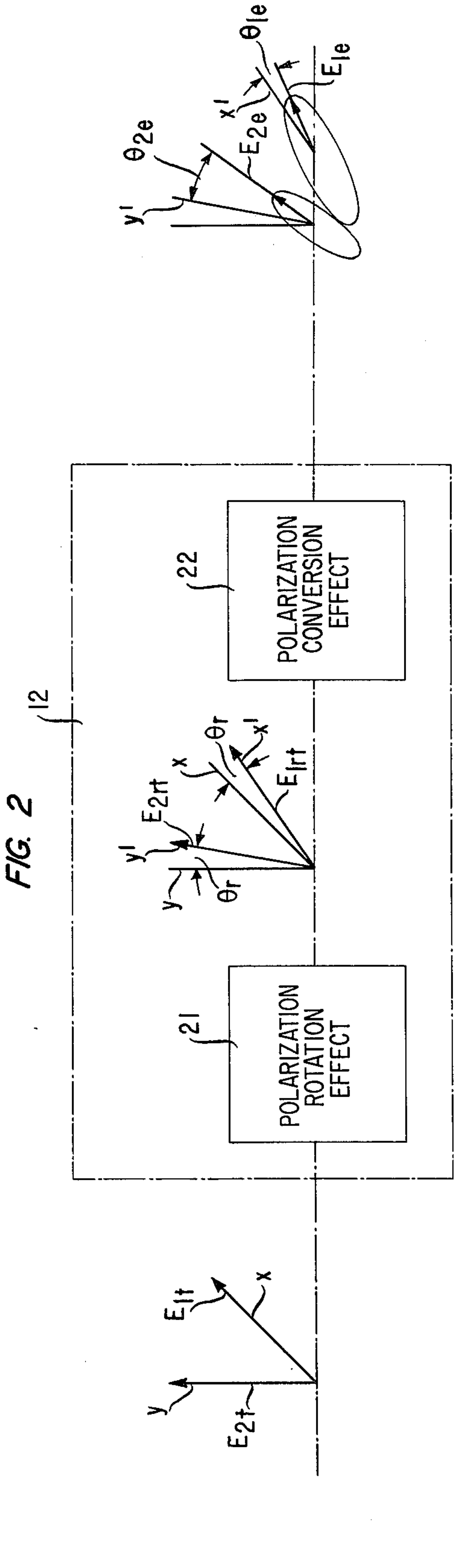
FIG. 2 illustrates the various effects of the satellite system channel upon orthogonal polarizations propagating between the satellite and earth station of the satellite system of FIG. 1.

More particularly, as shown in FIG. 2, the rotational effect of channel 12, which is represented by block 21 and which is due primarily to a Faraday rotation in the transmission medium, causes each of the linearly polarized transmitted waves $E_{1t}$ and $E_{2t}$ to be rotated in the same direction through a rotation angle $\theta_r$. As a result, the linearly polarized waves $E_{1t}$ and $E_{2t}$ are transformed by the rotational effect of the channel into a pair of rotated transmitted waves $E_{1rt}$ and $E_{2rt}$ which are also linearly polarized, but along a new set of orthogonal polarization directions, $x'$ and $y'$, the latter directions being rotated by an angle $\theta_r$ relative to the orthogonal polarization direction axes $x$ and $y$.

The polarization conversion effect of channel 12, which is depicted by block 22 in FIG. 2 and which is primarily a result of phase-shift and attenuation effects in feed horn and antenna system 15, in turn, acts upon linearly polarized waves $E_{1rt}$ and $E_{2rt}$ and causes each wave to be converted into an elliptically polarized wave having arbitrary characteristics. In particular, the rotated transmitted wave $E_{1rt}$ is converted into an elliptically polarized wave $E_{1e}$ having an axial ratio $A_{1e}$, and an angular orientation $\theta_{1e}$. The rotated transmitted wave $E_{2rt}$, on the other hand, is converted into an elliptically polarized wave $E_{2e}$ having an axial ratio $A_{2e}$, and an angular orientation $\theta_{2e}$. It is important to note, moreover, that the aforesaid parameters characterizing each of the elliptically polarized waves $E_{1e}$ and $E_{2e}$ are not constant but vary with time as a result of the variation with time of the rotation angle $\theta_r$ of the rotated transmitted waves $E_{1rt}$ and $E_{2rt}$.

Exiting from transmission channel 12 at earth station 16 are thus the two time varying elliptically polarized waves $E_{1e}$ and $E_{2e}$. These two waves are to be detected by earth station detection apparatus 17 which is orientated to detect waves polarized along the $x$ and $y$ polarization directions. Since each of the waves $E_{1e}$ and $E_{2e}$ has polarization components in both the $x$ and $y$ polarization directions, independent detection of these waves via apparatus 17 cannot be realized unless the polarizations of the waves are altered in a manner to counteract or cancel the polarization effects of channel 12. Thus, earth station 16 is provided with a polarization conversion apparatus 18 and a polarization rotation apparatus 19 which substantially counteract, respectively, the polarization conversion and polarization rotation effects of the channel.

More particularly, conversion apparatus 18 transforms the elliptically polarized waves $E_{1e}$ and $E_{2e}$ into two linearly polarized received rotated waves which are replicas of the two linearly polarized transmitted rotated waves. Thus coupled from apparatus 18 are the received rotated waves $E_{1rr}$ and $E_{2rr}$ which are replicas, respectively, of rotated transmitted waves $E_{1rt}$ and $E_{2rt}$. The waves $E_{1rr}$ and $E_{2rr}$ are, in turn, coupled into rotator 19 which rotates each wave in the same direction through an angle $-\theta_r$. Rotator 19 thus produces the two received waves $E_{1r}$ and $E_{2r}$ which are replicas, respectively, of the two transmitted waves $E_{1t}$ and $E_{2t}$. The waves $E_{1r}$ and $E_{2r}$, being linearly polarized along the $x$ and $y$ direction, can then be detected independently of one another by detection apparatus 17.

As above-indicated, the parameters characterizing elliptically polarized waves $E_{1e}$ and $E_{2e}$ change with time due to the changes with time of the rotation angle $\theta_r$. Polarization conversion apparatus 18 must therefore operate to provide the above-described conversion for all sets of parameters of the waves $E_{1e}$ and $E_{2e}$.

Figure 3:
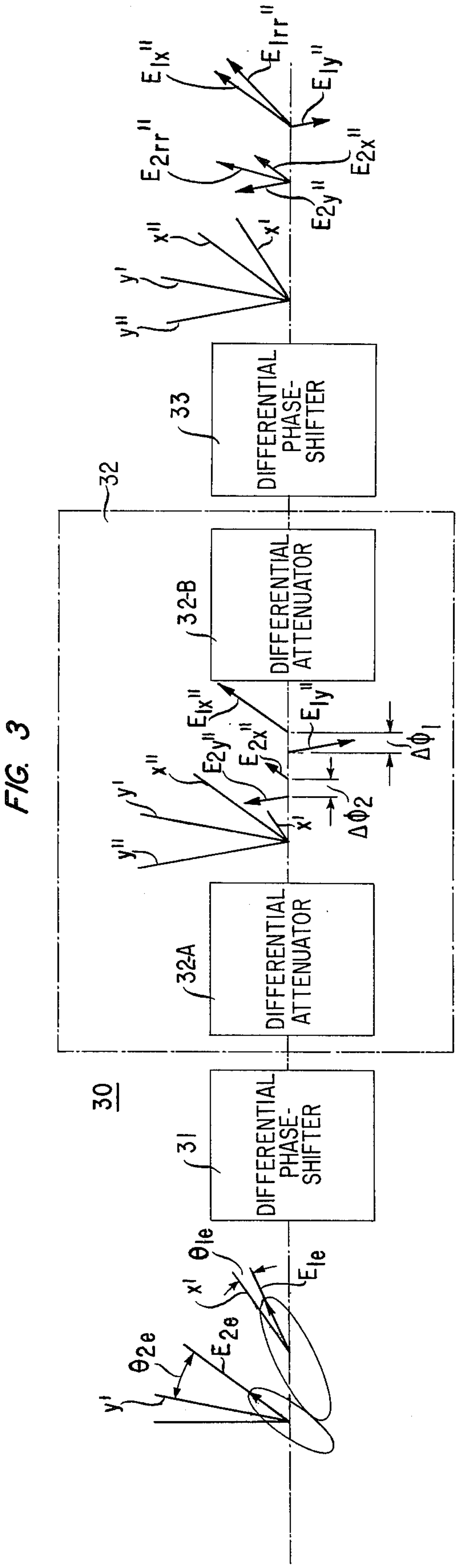
FIG. 3 shows a polarization conversion apparatus in accordance with the principles of the present invention.

In accordance with the principles of the present invention, a polarization conversion apparatus for achieving such operation is provided which includes three cascaded differential elements each having substantially fixed parameters. More particularly, FIG. 3 illustrates a fixed parameter polarization conversion apparatus 30, in accordance with the principles of the present invention. As shown, conversion apparatus 30 comprises a first differential phase-shifter 31, a differential attenuator 32 including first and second differential attenuator sections 32-A and 32-B, and a second differential phase-shifter 33.

Differential phase-shifter 31 and differential attenuator 32-A of apparatus 30 are adjusted in the manner described in the above-mentioned Chu reference so that their combined effect is to directly transform the elliptically polarized waves $E_{1e}$ and $E_{2e}$ into the received rotated waves $E_{1rr}$ and $E_{2rr}$ when the elliptical waves $E_{1e}$ and $E_{2e}$ have a particular set of axial ratios and orientations, i.e., when $A_{1e} = A_{1eo}$, $\theta_{1e} = \theta_{1eo}$, $A_{2e} = A_{2eo}$, and $\theta_{2e} = \theta_{2eo}$. The particular orientation values and phase-shift and attenuation values of the differential elements 31 aand 32-A for achieving such a result can be readily calculated from the expressions derived in the above Chu reference and, hence, are not presented herein.

It is noted, however, that the above-indicated set of axial ratios and orientations for the waves $E_{1e}$ and $E_{2e}$ pertain to a particular value $\theta_{ro}$ of the rotation angle $\theta_r$. When $\theta_r$ changes from such value, the waves $E_{1e}$ and $E_{2e}$ will therefore, take on a new set of characterizing parameters. As a result, when $\theta_r$ changes from $\theta_{ro}$, phase-shifter 31 and attenuator 32-A, will no longer act to directly transform the resultant $E_{1e}$ and $E_{2e}$ waves into the received rotated waves $E_{1rr}$ and $E_{2rr}$.

It has been discovered, however, that in the above situation, i.e, when $\theta_r \neq \theta_{ro}$, phase-shifter 31 and attenuator 32-A will instead transform each of the waves $E_{1e}$ and $E_{2e}$ into a pair of linearly polarized received wave components. Thus, as shown in FIG. 3, the output from phase-shifter 31 and attenuator 32-A when $\theta_r$ changes from $\theta_{ro}$ comprises a first pair of linearly polarized received wave components $E_{1x''}$ and $E_{1y''}$ which result from the transformation of the elliptically polarized wave $E_{1e}$ and a second pair of linearly polarized received wave components $E_{2x''}$ and $E_{2y''}$ which result from the transformation of the elliptically polarized wave $E_{2e}$.

As can be observed from FIG. 3, the aforesaid pairs of received wave components are polarized along the same pair of $x''$ and $y''$ orthogonal polarization directions, where such polarization directions are those along which lie the respective received rotated waves produced by phase-shifter 31 and attenuator 32-A when the angle $\theta_r$ is at $\theta_{ro}$. More importantly, however, it has been found that the aforesaid first and second pairs of wave components exhibit certain similar differential phase characteristics and certain similar amplitude ratio characteristics which, as will become clear, permit the pairs of wave components to be simultaneously converted to the received rotated waves $E_{1rr}$ and $E_{2rr}$ using fixed orientations and magnitudes for the attenuation section 32-B and phase-shifter 33.

More specifically, it has been found that for all characteristics of the elliptical waves $E_{1e}$ and $E_{2e}$ and, hence, for all angles $\theta_r$, the phase difference $\Delta\phi_1$ of the wave component $E_{1x''}$ relative to the wave component $E_{1y''}$ is a constant $\Delta\phi$ and is equal to the phase difference $\Delta\phi_2$ of the wave component $E_{2x''}$ relative to the wave component $E_{2y''}$, i.e., $\Delta\phi_1 = \Delta\phi_2 = \Delta\phi$. It has been also found, moreover, that for all values of $\theta_r$, the amplitude ratio $r_1 = E_{1x''}/E_{1y''}$ relative to the amplitude ratio $r_{1rt} = E_{1rtx''}/E_{1rty''}$ is a constant $r$, and is equal to the amplitude ratio $r_2 = E_{2x''}/E_{2y''}$ relative to the amplitude ratio $r_{2rt} = E_{2rtx''}/E_{2rty''}$, where the components $E_{1rtx''}$ and $E_{1rty''}$ are the components along the $x''$ and $y''$ directions, respectively, of the rotated transmitted wave $E_{1rt}$ and the components $E_{2rtx''}$ and $E_{2rty''}$ are the components along such directions of the rotated transmitted wave $E_{2rt}$.

It is apparent from the aforesaid, therefore, that the received wave components $E_{1x''}$ and $E_{1y''}$ can be brought into phase with each other and, simultaneously, that the received wave components $E_{2x''}$ and $E_{2y''}$ can be brought into phase with each other by applying a constant differential phase-shift along the $x''$ and $y''$ polarization directions such that the differential phase-shift $\Delta\phi$ is cancelled (i.e., made equal to 0). It is also quite apparent from the aforesaid that the received wave components $E_{1x''}$ and $E_{1y''}$ can be made to have the same amplitude ratio as the wave components $E_{1rtx''}$ and $E_{1rty''}$ of the rotated transmitted wave $E_{1rt}$ and, simultaneously, that the received wave components $E_{2x''}$ and $E_{2y''}$ can be made to have the same amplitude ratio as the wave components $E_{2rtx''}$ and $E_{2rty''}$ of the transmitted rotated $E_{2rt}$ by applying a constant differential attenuation along the x'' and y'' directions such that the proportionality factor $r$ is made equal to 1.

In accordance with the principles of the present invention, therefore, the attenuator section 32-B is oriented and selected to have a differential attenuation so as to produce the latter result, while the differential phase-shift section 33 is oriented and selected to have a differential phase-sshift so as to produce the former result. More specifically, if for purposes of illustration, $\Delta\phi$ is assumed to be positive, then this indicates that the transmission channel has resulted in the wave components $E_{1x''}$ and $E_{2x''}$ being advanced in phase relative to the wave components $E_{1y''}$ and $E_{2y''}$. Thus, in such a case, phase-shifter 33 would be selected to provide a constant differential phase-shift of magnitude $\Delta\phi$ and would be fixed in orientation with its axes along the $x''$ and $y''$ direction so that the wave components in the $y''$ direction are advanced in phase by the amount $\Delta\phi$ relative to those in $x''$ direction.

With respect to the differential attenuation to be provided by differential attenuator 32-B, if for purposes of illustration, it is assumed that the proportionality factor $r$ is less than 1, this indicates that the transmission channel has attenuated the waves $E_{1x''}$ and $E_{2x''}$ to a greater degree by a factor r than it has attenuated the waves $E_{1y''}$ and $E_{2y''}$. Thus to cancel such a difference in attenuation, differential attenuator 32-B would be selected to provide a constant differential attenuation along the $x''$ and $y''$ directions such that the wave components in the $y''$ direction are attenuated to a greater degree by a factor $r$ than those in the $x''$ direction.

Having adjusted attenuator 32-B and phase-shifter 33, in accordance with the above, passage of the received wave components $E_{1x'}$ and $E_{1y''}$ therethrough will cause these two wave components to have the same zero phase difference and same amplitude ratio as the wave components $E_{1rtx''}$ and $E_{1rty''}$. The wave components $E_{1x''}$ and $E_{1y''}$ will thus vectorally sum to the received rotated wave $E_{1rr''}$ which, as above-indicated, is a replica of the transmitted rotated wave $E_{1rt}$. Similarly, passage of the wave components $E_{2x''}$ and $E_{2y''}$ will thus cause these two wave components to have the same zero phase difference and same amplitude ratio as the wave components $E_{2rtx''}$ and $E_{2rty''}$. Thus the wave components $E_{2x''}$ and $E_{2y''}$ will vectorally sum to the received rotated wave $E_{2rr}$ which is a replica of the transmitted rotated wave $E_{2rt}$.

Since, as above-indicated, the differential phase-shift $\Delta\phi$ and proportionality factor $r$ do not change with changes in the rotation angle $\theta_r$, the above result will likewise occur for all values of $\theta_r$ without having to make further adjustments in the parameter values of phase-shifter 31, attenuator 32 and phase-shifter 33. Thus, the cascade of fixed parameter elements 31, 32, and 33 will act to transform the elliptically polarized waves $E_{1e}$ and $E_{2e}$ into the received rotated waves $E_{1rr}$ and $E_{2rr}$ for all variations of $\theta_r$, i.e., for all angular rotations of the polarization directions of the transmitted rotated waves $E_{1rt}$ and $E_{2rt}$.

As above-indicated, after the combination of elements 31, 32, and 33 forming polarization conversion apparatus 18 produce the received rotated waves $E_{1rr}$ and $E_{2rr}$, the polarization rotation apparatus 19 rotates these waves by an angle $-\theta_r$ to produce the received waves $E_{1r}$ and $E_{2r}$ which are replicas, respectively, of the transmitted waves $E_{1t}$ and $E_{2t}$. Typically, apparatus 19 might be any type of conventional polarization rotation mechanism, such as, for example a 180° phase-shift section whose orientation is controlled by a servomechanism so as to produce the required $-\theta_r$ rotation.

It should be noted also that each of the differential phase-shift elements 31 and 33 and each of the differential attenuator elements 32-A and 33-B of FIG. 3 can comprise a conventionally constructed differential waveguide section. Thus, for example, as disclosed in the above-mentioned Chu reference, a typical structure which can be used to provide a difference in phase-shift along orthogonal polarization directions and, hence, a structure which can be used for each of the differential phase-shift elements 31 and 33, might comprise a circular waveguide having disposed therein a thin elongated dielectric plate whose dimensions and orientation are selected so as to provide the desired differential phase-shift along the orthogonal directions. Likewise, as is also disclosed in the aforesaid Chu reference, a conventional microwave structure for providing a differential attenuation along a pair of orthogonal polarization directions and, thus, a structure which can be used for each of the differential attenuator elements 32-A and 32-B, might comprise a circular waveguide having disposed therein a resistance card whose dimensions and orientation are such as to provide the required differential attenuation along the orthogonal directions.

Figure 4:
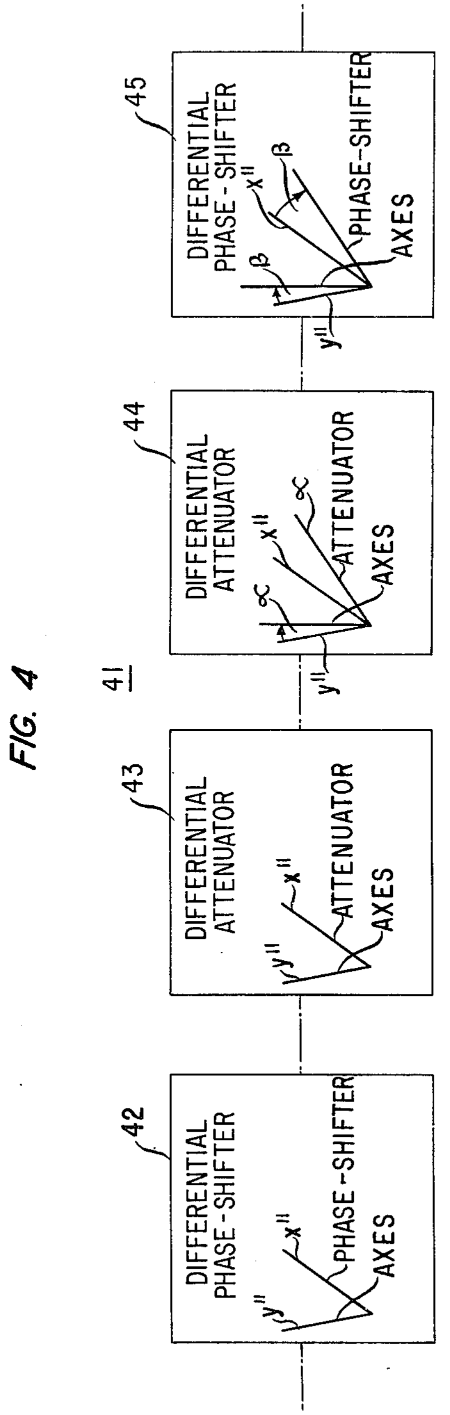
FIG. 4, included for purposes of explanation, shows a discrete element simulation of the polarization conversion effects of FIG. 2.

As above-indicated, for all angles of rotation $\theta_r$, polarization conversion apparatus 30 comprising the fixed cascade of elements 31 and 32 and 33 acts to transform the elliptically polarized waves $E_{1e}$ and $E_{2e}$ produced by the transmission system 12 into the received rotated waves $E_{1rr}$ and $E_{2rr}$. An insight of why such a combination of elements acts to produce such a result can be obtained from a study of FIG. 4 which illustrates a system 41 which simulates the polarization conversion effects of channel 12. More particularly, it can be seen that such a system comprises a cascade of differential elements, the first two effecting only changes in the relative magnitude and relative phase of waves polarized along the $x''$ and $y''$ polarization directions and the second two effecting changes primarily in the polarization states of such waves.

As illustrated, system 41 comprises a first differential phase-shifter 42 and a first differential attenuator 43 both of whose axes are aligned with the $x''$ and $y''$ directions. These elements thus, as indicated above, do not alter the polarization states of waves polarized along such directions but merely change the phase and amplitude of one wave relative to the other.

System 41, additionally, comprises a second differential attenuator 44 and a second differential phase-shifter 45, both of whose axes are not aligned with the $x''$ and $y''$ polarization directions. Attenuator 44 has its axes at an angle $\alpha$ relative to such directions while phase-shifter 45 has its axes at an angle $\beta$ relative thereto. With such orientations of elements 44 and 45, both elements do alter the polarization states of waves in the $x''$ and $y''$ polarization directions. More particularly, it can be shown that the combination of attenuator 44 and phase-shifter 45, acts to convert linearly polarized waves polarized along the $x''$ and $y''$ polarization directions into elliptically polarized waves having arbitrary axial ratios and orientations.

It is observed, therefore, that the passage through system 41 of two linearly polarized waves initially polarized along the $x''$ and $y''$ directions, respectively, results in the conversion of such waves into two elliptically polarized waves, each having an arbitrary phase and amplitude relative to the other as a result of elements 42 and 43 respectively, and each having an arbitrary orientation and axial ratio as a result of elements 44 and 45. The cascade of elements of system 41 will thus cause the same effect on the aforesaid linearly polarized orthogonal waves as the above-discussed polarization conversion effects of channel 12. System 41 is thus seen to provide a satisfactory simulation of such effects.

It can be readily observed, therefore, from system 41 that the polarization conversion effects of channel 12 can be counteracted or cancelled by passing waves leaving the system through a cascade of four differential elements, the first having characteristics to cancel the effect of phase-shifter 45, the second having characteristics to cancel the effect of attenuator 44, the third having characteristics to cancel the effects of attenuator 43 and the last having characteristics to cancel the effect of phase-shifter 42. As is apparent, the apparatus of FIG. 3 is precisely such a cascade of elements and, hence, it performs the above function of canceling the polarization conversion effects of the channel.

In all cases, it is understood that the above-described arrangements are merely illustrative of some of the many possible specific embodiments which represent applications of the present invention. Numerous and varied other arrangements can readily be devised in accordance with these principles without departing from the spirit and scope of the invention. For example, the functions performed by the two differential attenuation sections 32-A and 32-B of polarization conversion apparatus 30 could also be performed by an equivalent single differential attenuation section having appropriately adjusted but fixed characteristics.

What is claimed is:

1. Apparatus responsive to first and second elliptically polarized waves which are formed by the action of a transmission channel on first and second linearly polarized waves, said first and second linearly polarized waves being polarized along first and second orthogonal polarization directions which rotate, thereby causing the characteristics of said first and second elliptically polarized waves to change, comprising:

polarization conversion means including a first differential phase shifter, a first differential attenuator and a second differential phase-shifter;

said first and second differential phaseshifters and said first differential attenuator having fixed characteristics which are adjusted to cause said first and second elliptically polarized waves to be converted, for all rotations of said first and second directions, into third and fourth linearly polarized waves which are replicas, respectively, of said first and second linearly polarized waves.

2. Apparatus in accordance with claim 1 in which said first phase-shifter, first attenuator and second phase-shifter are arranged in cascade.

3. Apparatus in accordance with claim 2 in which said first attenuator is disposed between said first and second phase-shifter.

4. Apparatus in accordance with claim 1 in which said attenuator comprises first and second differential attenuator sections.

5. Apparatus in accordance with claim 4 in which:

said first phase-shifter and said first attenuator section are adjusted such that when said rotation is a given amount their combined effect is to convert said first and second elliptically polarized waves directly into said third and fourth waves and such that when said rotation is different from said given amount their combined effect is to convert said first and second elliptically polarized waves into first and second pairs of linearly polarized wave components corresponding, respectively, to said first and second linearly polarized waves, one of the wave components of each of said pairs being polarized along a third polarization direction and the other of said wave components of each of said pairs being polarized along a fourth orthogonal polarization direction, said first pair having amplitudes whose ratio relative to that of the ratio of the amplitudes of the wave components along third and fourth directions which combine to form said first linearly polarized wave is a first constant amount, and phases which differ by a second constant amount, and said second pair having amplitudes whose ratio relative to that of the ratio of the amplitudes of the wave components in said third and fourth directions which combine to form said second linearly polarized wave is a constant amount equal to said first amount, and phases which differ by a constant amount equal to said second amount;

said second attenuator section is adjusted to apply a differential attenuation to said first and second pairs such that the ratio of the amplitudes of said first pair is made equal to the ratio of the amplitudes of said components which combine to form said first linearly polarized wave, and the ratio of the amplitudes of said second pair is made equal to the ratio of the amplitudes of said components of which combine to form said second linearly polarized wave;

and said second phase-shifter is adjusted to apply a differential phase-shift to said first and second pairs such that the phase difference between said first pair is made equal to zero and the phase difference between said second pair is made equal to zero.

6. Apparatus in accordance with claim 5 in which:

said second attenuator is adjusted to apply a differential attenuation to said first and second pairs so as to cause said first amount to be made equal to unity:

and said second phase-shifter is adjusted to apply a differential phase-shift to said first and second pairs so as to cause said second amount to be made equal to zero.

7. In a satellite communications system which includes a transmission channel which exhibits a polarization conversion effect and a polarization rotation effect, which effects act to transform linearly polarized waves transmitted through the channel into elliptically polarized waves having arbitrary characteristics which change with changes in said rotation effect;

polarization conversion means including a first differential phase-shifter, a first differential attenuator and a second differential phase-shifter;

said first and second differential phaseshifters and said first differential attenuator having fixed characteristics which are adjusted to counteract said conversion effect for all changes in said rotation effect.

8. A system in accordance with claim 7 which includes, in addition, polarization rotation means for counteracting said polarization rotation effect.

9. A system in accordance with claim 7 which includes an earth station and in which said conversion means is disposed at said earth station.

10. A system in accordance with claim 7 in which:

said polarization rotation effect acts to rotate the polarization directions of said linearly polarized waves by a changing amount to form rotated linearly polarized waves;

said polarization conversion effect acts to transform said rotated waves into said elliptically polarized waves whose characteristics change with changes in said amount of rotation; and said conversion means, for all changes in said amount of rotation, converts said elliptically polarized waves into linearly polarized waves which are replicas of said rotated waves.

* * * * *